United States Patent
Münzmay et al.

(10) Patent No.: US 8,772,408 B2
(45) Date of Patent: *Jul. 8, 2014

(54) BINDERS CONTAINING NANOPARTICLES

(75) Inventors: Thomas Münzmay, Dormagen (DE); Alice Münzmay, legal representative, Dormagen (DE); Michael Mager, Leverkusen (DE); Markus Mechtel, Bergisch-Gladbach (DE); Nusret Yuva, Burscheid (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,108

(22) Filed: Aug. 17, 2012

(65) Prior Publication Data

US 2012/0316281 A1 Dec. 13, 2012

Related U.S. Application Data

(62) Division of application No. 12/338,489, filed on Dec. 18, 2008.

(30) Foreign Application Priority Data

Dec. 19, 2007 (DE) .......................... 10 2007 061 876

(51) Int. Cl.

| C08G 18/52 | (2006.01) |
|---|---|
| C09D 175/04 | (2006.01) |
| C08K 3/34 | (2006.01) |
| C08G 18/70 | (2006.01) |
| C08G 18/62 | (2006.01) |
| C08K 3/36 | (2006.01) |
| C08K 9/04 | (2006.01) |

(52) U.S. Cl.
CPC .......... *C08G 18/6254* (2013.01); *C08G 18/706* (2013.01); *C08K 3/36* (2013.01); *C08K 9/04* (2013.01); *C09D 175/04* (2013.01)
USPC .............. 525/100; 525/479; 525/94; 528/32; 524/430; 524/590

(58) Field of Classification Search
USPC ........ 525/100, 479, 94; 528/32; 524/430, 590
See application file for complete search history.

(56) References Cited

U.S. PATENT DOCUMENTS

| 6,022,919 A | * | 2/2000 | Komoto et al. ............... 524/430 |
| 6,720,072 B1 | | 4/2004 | Hinterwaldner et al. |
| 2001/0056154 A1 | * | 12/2001 | Blum et al. ................... 524/522 |
| 2005/0159523 A1 | | 7/2005 | Bremser et al. |
| 2007/0055016 A1 | * | 3/2007 | Niesten et al. ................ 525/100 |
| 2008/0017071 A1 | | 1/2008 | Moebus et al. |

FOREIGN PATENT DOCUMENTS

| DE | 19846660 A1 | | 4/2000 |
| GB | 1407827 | * | 8/1975 |
| WO | WO-00/39181 A1 | | 7/2000 |
| WO | WO-02/24756 A2 | | 3/2002 |
| WO | WO-03/044099 A1 | | 5/2003 |
| WO | WO-03/095532 A1 | | 11/2003 |
| WO | WO-2004/035474 A1 | | 4/2004 |
| WO | WO-2006/008120 A1 | | 1/2006 |

* cited by examiner

Primary Examiner — Kelechi Egwim

(57) ABSTRACT

The present invention relates to aqueous binder dispersions based on silane-modified polymeric binders and inorganic nanoparticles, a process for the preparation thereof and the use thereof for the production of high quality coatings, in particular clear lacquers.

5 Claims, No Drawings

BINDERS CONTAINING NANOPARTICLES

RELATED APPLICATIONS

This application is a divisional of U.S. patent application Ser. No. 12/338,489, filed Dec. 18, 2008, which claims benefit to German Patent Application No. 10 2007 061 876.0, filed Dec. 19, 2007, which is incorporated herein by reference in its entirety for all useful purposes.

BACKGROUND OF THE INVENTION

The present invention relates to aqueous binder dispersions based on silane-modified polymeric binders and inorganic nanoparticles, a process for the preparation thereof and the use thereof for the preparation of high quality coatings, in particular clear lacquers.

Nanoparticles in polymeric coatings can improve properties such as scratch resistance, UV protection or conductivity in a targeted manner. Control of the surface modification and dispersing of the nanoparticles determines the required transparent appearance of the coatings and properties thereof.

Various approaches have been pursued in the past for introduction of the nanoparticles into coating composition formulations. In this context, the particles can be mixed directly into the resin or curing agent component or into the coating composition ready for application. In aqueous systems there is the possibility of dispersing the particles in the aqueous phase. The in situ preparation of the particles in one of the binder components and adaptation of the surface to either the resin or the curing agent component have furthermore been described.

From the practical point of view, it is advantageous to disperse the nanoparticles as stable masterbatches in one of the components, so that a long-term storage stability and a simple ease of handling in the formulation of lacquers is ensured. In the end use, the nanoparticles must likewise be readily dispersible in a finely divided manner, so that advantageous properties such as transparency, scratch resistance or conductivity result.

In practice, the nanoparticles are conventionally dispersed into the resin component, into the aqueous phase or into the finished mixture of curing agent and resin shortly before curing. As a rule, for this it is necessary to adapt the surface of the nanoparticles to the specific matrix of the coating composition or of the adhesive. The disadvantage of simple mixing in of modified nanoparticles is the dependency of the stability on the complete formulation, i.e. on all the formulation constituents. Variation of one parameter can lead here to demixing (Pilotek, Steffen; Tabellion, Frank (2005), European Coatings Journal, 4, 170 et seq.).

It is known from the prior art that coating compositions can be prepared with silane-modified nanoparticles. For example, WO-A 02/24756 discloses coating compositions based on suspension polymers and silane-modified nanoparticles. However, the polymers described there are suspension and emulsion polymers. Suspension polymerization is carried out in an aqueous phase, like emulsion polymerization. Beads of solid, which are filtered off from the aqueous phase, form the end product of the suspension.

WO-A 2006/008120 describes aqueous dispersions of polymeric and/or oligomeric organic binders and inorganic nanoparticles. The nanoparticles are surface-modified by addition of silane-functional compounds. The disadvantage here, however, is that the gloss and haze of the resulting coatings do not meet the high requirements of automobile clear lacquers.

WO-A 03/095532 discloses aqueous dispersions of hydrophilized polymers or oligomers which contain surface-modified inorganic nanoparticles and at least one amphiphile. Possible hydrophilic polymers are emulsion polymers, which are prepared in an aqueous phase. The use of the amphiphiles, which are necessary according to this teaching, is a disadvantage since these low molecular weight alcohols must be included as solvents in the VOC balance (volatile organic compounds). Furthermore, these are highly reactive mono- or polyol compounds which co-react, for example, with polyisocyanates during crosslinking of the binders and lead to a reduced functionality up to chain termination. The network build-up of the resulting lacquers impaired in this way leads to a reduction in resistances.

It has now been found, surprisingly, that aqueous copolymers which are modified with a certain class of silanes are suitable, in combination with inorganic nanoparticles, for the production of coatings having a significantly improved scratch resistance with excellent gloss and very low haze (cloudiness).

The object of the present invention was thus to provide high quality coating compositions, in particular as automobile clear lacquers, which have an optimum gloss and haze and show an improved scratch resistance. The dispersions should furthermore be sufficiently stable to storage.

EMBODIMENTS OF THE INVENTION

An embodiment of the present invention is an aqueous formulation comprising
A) a silane-modified copolymer;
B) optionally surface-modified inorganic particles having an average particle size (z-mean), as determined by means of dynamic light scattering in dispersion, of less than 200 nm; and
C) water.

Another embodiment of the present invention is the above aqueous formulation, wherein said silane-modified copolymer A) comprises groups of general formula (1)

$$-Si(R^1O)_2R^2 \qquad (1)$$

wherein
$R^1$ is a $C_2$- to $C_8$-alkyl radical; and
$R^2$ is $(R^1O)$ or a $C_1$- to $C_5$-alkyl radical.

Another embodiment of the present invention is the above aqueous formulation, wherein said silane-modified copolymer A) is a copolymer which is built up from
I) a hydroxy-functional hydrophobic polymer containing as builder monomers
Ia) (meth)acrylic acid esters having $C_1$- to $C_{18}$-hydrocarbon radicals in the alcohol part and/or vinylaromatics and/or vinyl esters;
Ib) hydroxy-functional monomers; and
IS1) silane-functional monomers capable of polymerization;
and
II) a hydroxy-functional hydrophilic polymer containing as builder components
IIa) (meth)acrylic acid esters having $C_1$- to $C_{18}$-hydrocarbon radicals in the alcohol part and/or vinylaromatics and/or vinyl esters;
IIb) hydroxy-functional monomers; and
IIc) acid-functional monomers.

Another embodiment of the present invention is the above aqueous formulation, wherein said silane-modified copolymer A) is a copolymer which is built up from I) a hydroxy-functional hydrophobic polymer containing as builder monomers
   Ia) (meth)acrylic acid esters having $C_1$- to $C_{18}$-hydrocarbon radicals in the alcohol part and/or vinylaromatics and/or vinyl esters; and
   Ib) hydroxy-functional monomers;
and
II) a hydroxy-functional hydrophilic polymer containing as builder components
   IIa) (meth)acrylic acid esters having $C_1$- to $C_{18}$-hydrocarbon radicals in the alcohol part and/or vinylaromatics and/or vinyl esters;
   IIb) hydroxy-functional monomers;
   IIc) acid-functional monomers; and
   IIS1) silane-functional monomers capable of polymerization.

Another embodiment of the present invention is the above aqueous formulation, wherein said silane-functional monomer IS1), which is capable of polymerization, is a compound of the general formula (2)

$$(R^1O)_2R^2Si-(CH=CH_2) \qquad (2)$$

wherein
   $R^1$ is a $C_2$- to $C_8$-alkyl radical; and
   $R^2$ is $(R^1O)$ or a $C_1$- to $C_5$-alkyl radical;
and/or a compound of the general formula (3)

$$(R^1O)_2R^2Si(CH_2)_m-O(CO)-(CR^3=CH_2) \qquad (3)$$

wherein
   $R^1$ is a $C_2$- to $C_8$-alkyl radical;
   $R^2$ is $(R^1O)$ or a $C_1$- to $C_5$-alkyl radical;
   $R^3$ is H or $CH_3$; and
   m is 1 to 4.

Another embodiment of the present invention is the above aqueous formulation, wherein said silane-functional monomer IIS1), which is capable of polymerization, is a compound of the general formula (2)

$$(R^1O)_2R^2Si-(CH=CH_2) \qquad (2)$$

wherein
   $R^1$ is a $C_2$- to $C_8$-alkyl radical; and
   $R^2$ is $(R^1O)$ or a $C_1$- to $C_5$-alkyl radical;
and/or a compound of the general formula (3)

$$(R^1O)_2R^2Si(CH_2)_m-O(CO)-(CR^3=CH_2) \qquad (3)$$

wherein
   $R^1$ is a $C_2$- to $C_8$-alkyl radical;
   $R^2$ is $(R^1O)$ or a $C_1$- to $C_5$-alkyl radical;
   $R^3$ is H or $CH_3$; and
   m is 1 to 4.

Another embodiment of the present invention is the above aqueous formulation, wherein said silane-functional monomer IS1), which are capable of polymerization, is selected from the group consisting of vinyltriethoxysilane, vinyltrisisopropoxysilane, vinyl-tris-(2-methoxyethoxy)silane, vinylmethyldiethoxysilane, vinylmethyldiisopropoxysilane, vinylethyldiethoxysilane, 3-(triethoxysilyl)-propyl methacrylate or 3-(tris-isopropoxysilyl)-propyl methacrylate, vinylphenyldiethoxysilane, vinylphenylmethylethoxysilane, and vinyltri-t-butoxysilane.

Another embodiment of the present invention is the above aqueous formulation, wherein said silane-functional monomers IS1), which are capable of polymerization, is selected from the group consisting of vinyltriethoxysilane, vinyltrisisopropoxysilane, vinyl-tris-(2-methoxyethoxy)silane, vinylmethyldiethoxysilane, vinylmethyldiisopropoxysilane, vinylethyldiethoxysilane, 3-(triethoxysilyl)-propyl methacrylate or 3-(tris-isopropoxysilyl)-propyl methacrylate, vinylphenyldiethoxysilane, vinylphenylmethylethoxysilane, and vinyltri-t-butoxysilane.

Another embodiment of the present invention is the above aqueous formulation, wherein said silane functional copolymer A) is a copolymer which is built up from
I) a hydroxy-functional hydrophobic polymer containing as builder monomers
   Ia) (meth)acrylic acid esters having $C_1$- to $C_{18}$-hydrocarbon radicals in the alcohol part and/or vinylaromatics and/or vinyl esters;
   Ib) hydroxy-functional monomers;
and
II) a hydroxy-functional hydrophilic polymer containing as builder components
   IIa) (meth)acrylic acid esters having $C_1$- to $C_{18}$-hydrocarbon radicals in the alcohol part and/or vinylaromatics and/or vinyl esters;
   IIb) hydroxy-functional monomers;
   IIc) acid-functional monomers; and
   IIS2) monomers which contain at least one epoxide function in addition to silane groups.

Another embodiment of the present invention is the above aqueous formulation, wherein said monomers IIS2) are selected from the group consisting of γ-glycidoxypropyltriethoxysilane, γ-glycidoxypropyl-tris-isopropoxysilane, γ-glycidoxypropyl-diethoxy-methylsilane, β-(3,4-epoxycyclohexyl)-triethoxysilane, and β-(3,4-epoxycyclohexyl)-tris-isopropoxysilane.

Another embodiment of the present invention is the above aqueous formulation, wherein said inorganic particles B) are selected from the group consisting of inorganic oxides, mixed oxides, carbides, borides, and nitrides of elements of main group II to IV and/or elements of subgroup I to VIII of the periodic table, including the lanthanides.

Another embodiment of the present invention is the above aqueous formulation, wherein said inorganic particles B) are inorganic nanoparticles in a colloidally disperse form in organic solvents or in water.

Another embodiment of the present invention is the above aqueous formulation, wherein said inorganic particles B) are inorganic particles in the form of aqueous formulations.

Another embodiment of the present invention is the above aqueous formulation, wherein said inorganic particles B) are surface-modified inorganic nanoparticles.

Yet another embodiment of the present invention is an aqueous coating composition comprising the above aqueous formulation and at least one crosslinking agent D).

Yet another embodiment of the present invention is an aqueous two-component coating composition comprising the above aqueous formulation and a polyisocyanate.

Yet another embodiment of the present invention is a clear lacquer comprising the above aqueous formulation.

DESCRIPTION OF THE INVENTION

The present invention therefore provides aqueous formulations comprising
A) a silane-modified copolymer,
B) inorganic particles which are optionally surface-modified and have an average particle size (z-mean), determined by means of dynamic light scattering in dispersion, of less than 200 nm and
C) c) water.

The silane-modified copolymer A) contains groups of the general formula (1)

$$-Si(R^1O)_2R^2 \qquad (1)$$

in which
R¹ is a C₂- to C₈-alkyl, preferably a C₃- to C₆-alkyl radical
and
R² is (R¹O) or a C₁- to C₅-alkyl radical, preferably is (R¹O)
or a C₁- to C₃-alkyl radical.

The aqueous formulations according to the invention comprise 20 to 59 parts by wt., preferably 25 to 48 parts by wt. and particularly preferably 27.5 to 40 parts by wt. of copolymer A), 1 to 40 parts by wt., preferably 2 to 25 parts by wt. and particularly preferably 2.5 to 15 parts by wt, of inorganic nanoparticles B), 5 to 44 parts by wt., preferably 10 to 33 parts by wt. and particularly preferably 12.5 to 25 parts by wt. of crosslinking agent C and 35 to 74 parts by wt., preferably 40 to 63 parts by wt. and particularly preferably 45 to 57.5 parts by wt. of water D).

In a first embodiment (α), component A) is a copolymer which is built up from
I) a hydroxy-functional hydrophobic polymer containing as builder monomers
Ia) (meth)acrylic acid esters having C₁- to C₁₈-hydrocarbon radicals in the alcohol part and/or vinylaromatics and/or vinyl esters,
Ib) hydroxy-functional monomers and
IS1) silane-functional monomers which are capable of polymerization, and
II) a hydroxy-functional hydrophilic polymer containing as builder components
IIa) (meth)acrylic acid esters having C₁- to C₁₈-hydrocarbon radicals in the alcohol part and/or vinylaromatics and/or vinyl esters,
IIb) hydroxy-functional monomers and
IIc) acid-functional monomers.

This embodiment (α) is preferred.

In a further embodiment (β), component A) is a copolymer which is built up from
I) a hydroxy-functional hydrophobic polymer containing as builder monomers
Ia) (meth)acrylic acid esters having C₁- to C₁₈-hydrocarbon radicals in the alcohol part and/or vinylaromatics and/or vinyl esters,
Ib) hydroxy-functional monomers and
II) a hydroxy-functional hydrophilic polymer containing as builder components
IIa) (meth)acrylic acid esters having C₁- to C₁₈-hydrocarbon radicals in the alcohol part and/or vinylaromatics and/or vinyl esters,
IIb) hydroxy-functional monomers,
IIc) acid-functional monomers and
IIS1) silane-functional monomers which are capable of polymerization.

The content of monomers Ia)/IIa) in the copolymer A) in embodiments (α) and (β) is 34.3 to 89.3 parts by wt., preferably 51.8 to 84.8 parts by wt. and particularly preferably 58 to 81 parts by wt., the content of monomers Ib)/IIb) in the copolymer A) is 10 to 65 parts by wt., preferably 13.5 to 46.5 parts by wt. and particularly preferably 17 to 40 parts by wt., the content of monomers IIc) in the copolymer A) is 0.6 to 12 parts by wt., preferably 1.2 to 5.5 parts by wt. and particularly preferably 1.25 to 3.5 parts by wt. and the content of monomers IS1)/IIS1) in the copolymer A) is 0.1 to 12 parts by wt., preferably 0.5 to 5 parts by wt. and particularly preferably 0.75 to 3.5 parts by wt.

Suitable silane-functional monomers IS1) and IIS1) which are capable of polymerization are e.g. compounds of the general formula (2)

$$(R^1O)_2R^2Si-(CH=CH_2) \tag{2}$$

in which
R¹ is a C₂- to C₈-alkyl, preferably a C₃- to C₆-alkyl radical,
R² is (R¹O) or a C₁- to C₅-alkyl radical, preferably is (R¹O)
or a C₁- to C₃-alkyl radical,
and/or compounds of the general formula (3)

$$(R^1O)_2R^2Si(CH_2)_m-O(CO)-(CR^3=CH_2) \tag{3}$$

in which
R¹ is a C₂- to C₈-alkyl, preferably a C₃-C₆-alkyl radical,
R² is (R¹O) or a C₁- to C₅-alkyl radical, preferably is (R¹O)
or a C₁- to C₃-alkyl radical,
R³ is H or CH₃ and
m is 1 to 4, preferably 3.

Examples of suitable silane-functional monomers IS1) and IIS1) which are capable of polymerization are vinyltriethoxysilane, vinyltrisisopropoxysilane, vinyl-tris-(2-methoxy)silane, vinylmethyldiethoxysilane, vinylmethyldiisopropoxysilane, vinylethyldiethoxysilane, 3-(triethoxysilyl)-propyl methacrylate or 3-(tris-isopropoxysilyl)-propyl methacrylate, vinylphenyldiethoxysilane, vinylphenylmethylethoxysilane or vinyltri-t-butoxysilane. Vinyltrisisopropoxysilane is preferred It is also possible for component A) (embodiment (γ)) to be a copolymer which is built up from
I) a hydroxy-functional hydrophobic polymer containing as builder monomers
Ia) (meth)acrylic acid esters having C₁- to C₁₈-hydrocarbon radicals in the alcohol part and/or vinylaromatics and/or vinyl esters,
Ib) hydroxy-functional monomers and
II) a hydroxy-functional hydrophilic polymer containing as builder components
IIa) (meth)acrylic acid esters having C₁- to C₁₈-hydrocarbon radicals in the alcohol part and/or vinylaromatics and/or vinyl esters,
IIb) hydroxy-functional monomers,
IIc) acid-functional monomers and
IIS2) monomers which contain at least one epoxide function in addition to silane groups.

The content of monomers Ia)/IIa) in the copolymer A) in embodiment (γ) is 33.8 to 88.8 parts by wt., preferably 49.1 to 83.9 parts by wt. and particularly preferably 56 to 79.5 parts by wt., the content of monomers Ib)/IIb) in the copolymer A) is 10 to 65 parts by wt, preferably 13.5 to 48.3 parts by wt. and particularly preferably 17 to 40.5 parts by wt., the content of monomers IIc) in the copolymer A) is 1 to 15 parts by wt., preferably 1.85 to 8 parts by wt. and particularly preferably 2.5 to 6.5 parts by wt. and the content of monomers IIS2) in the copolymer A) is 0.2 to 12 parts by wt., preferably 0.75 to 5.5 parts by wt. and particularly preferably 1 to 4.5 parts by wt.

Examples of suitable monomers IIS2) which contain at least one epoxide function in addition to silane groups are γ-glycidoxypropyltriethoxysilane, γ-glycidoxypropyl-tris-isopropoxysilane, γ-glycidoxypropyl-diethoxy-methylsilane, glycidoxypropyl-di-isopropoxy-methylsilane, β-(3,4-epoxycyclohexyl)-triethoxysilane, β-(3,4-epoxycyclohexyl)-tris-isopropoxysilane, β(3,4-epoxycyclohexyl)-diethoxy-methylsilane, β-(3,4-epoxycyclohexyl)-di-isopropoxy-methylsilane, β(3,4-epoxycyclohexyl)-diethoxy-ethylsilane or β-(3,4-epoxycyclohexyl)-di-isopropoxy-ethylsilane.
γ-Glycidoxypropyltriethoxysilane, γ-glycidoxypropyl-tris-isopropoxysilane, γ-glycidoxypropyl-diethoxy-methylsilane, β-(3,4-epoxycyclohexyl)-triethoxysilane or β-(3,4-epoxycyclohexyl)-tris-isopropoxysilane is preferred and
γ-glycidoxypropyl-tris-isopropoxysilane, γ-glycidoxypropyl-diethoxy-methylsilane and β-(3,4-epoxycyclohexyl)-tris-isopropoxysilane are particularly preferred.

Suitable monomers Ia)/IIa) are the esterification products of acrylic or methacrylic acid with simple alcohols, e.g. ethyl acrylate, ethyl methacrylate, n-butyl acrylate, iso-butyl acrylate, tert-butyl acrylate, 2-ethylhexyl acrylate, 2-ethylhexyl methacrylate, methyl methacrylate, n-butyl methacrylate, iso-butyl methacrylate, tert-butyl methacrylate, cyclohexyl acrylate or cyclohexyl methacrylate, and vinylphenyls, such as styrene, vinyltoluene, α-methylstyrene or mixtures of these and other monomers.

Further compounds of the (meth)acrylic acid ester type which are suitable as monomers Ia)/IIa) are the esters of acrylic acid or methacrylic acid with linear aliphatic monools having eight carbon atoms, such as e.g. the so-called fatty alcohols (monools), or with linear aliphatic saturated alcohols which are derived from naturally occurring fatty acids, such as lauryl ($C_{12}$), myristyl ($C_{14}$), palmityl ($C_{16}$) or stearyl ($C_{18}$) alcohol. Aliphatic saturated alcohols which are likewise suitable are e.g. n-octanol, nonanol or n-decanol. Suitable monomers of the (meth)acrylic acid ester type which contain an aliphatic radical having at least eight carbon atoms are e.g. n-octyl acrylate, nonyl acrylate, n-decyl acrylate, lauryl acrylate, myristyl acrylate, palmityl acrylate, stearyl acrylate and the corresponding methacrylic acid derivative.

Monomers of the abovementioned type which are furthermore suitable are esters of acrylic acid or methacrylic acid with cycloaliphatic alcohols (monools) having at least 10 carbon atoms, such as e.g. i-bornyl acrylate, n-bornyl methacrylate, dihydroxydicyclopentadienyl acrylate or 3,3,5-trimethylcyclohexyl methacrylate.

Suitable monomers Ia/IIa) are furthermore the esterification products of vinyl alcohol with linear or branched aliphatic carboxylic acids, such as, for example, vinyl acetate, vinyl propionate or vinyl butyrate. Vinyl esters which are preferred are those of branched aliphatic carboxylic acids of the general formula (4)

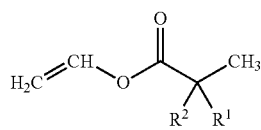

(4)

in which $R^1$ and $R^2$ are saturated alkyl groups containing together 6, 7 or 8 C atoms, corresponding to the compounds VeoVa™ (Hexion Specialty Chemicals, USA) 9, 10 and 11.

The monomers mentioned differ with respect to the glass transition temperature of their homopolymers:

| Monomer | $T_G$ [° C.] |
|---|---|
| VeoVa ™ 9 | +70 |
| VeoVa ™ 10 | −3 |
| VeoVa ™ 11 | −40 |

Preferred monomers Ia)/IIa) are n-butyl acrylate, iso-butyl acrylate, tert-butyl acrylate, 2-ethylhexyl acrylate, methyl methacrylate, n-butyl methacrylate, iso-butyl methacrylate, tert-butyl methacrylate, cyclohexyl acrylate, cyclohexyl methacrylate, i-bornyl acrylate, i-bornyl methacrylate and styrene, and n-butyl acrylate, 2-ethylhexyl acrylate, methyl methacrylate, n-butyl methacrylate, tert-butyl methacrylate, cyclohexyl methacrylate, i-bornyl acrylate, i-bornyl methacrylate and styrene are particularly preferred.

Further monomers which are capable of free-radical copolymerization can also optionally be employed as compounds of component Ia/IIa) in the preparation of copolymer A). These can be, for example, derivatives of acrylic or methacrylic acid, such as acrylamide, methacrylamide, acrylonitrile or methacrylonitrile. Vinyl ethers or vinyl acetates are furthermore optionally possible. Possible further components Ia/IIa) which are optionally to be employed in minor amounts are (meth)acrylate monomers which are difunctional or more than difunctional and/or vinyl monomers, such as e.g. hexanediol di(meth)acrylate or divinylbenzene.

Suitable hydroxy-functional monomers Ib)/IIb) are e.g. 2-hydroxyethyl methacrylate, 2-hydroxypropyl methacrylate, 2-hydroxyethyl acrylate, 2-hydroxypropyl acrylate, 4-hydroxybutyl acrylate or 4-hydroxybutyl methacrylate. Preferred monomers Ib)/IIb) are 2-hydroxyethyl acrylate, 2-hydroxyethyl methacrylate, 2-hydroxypropyl methacrylate or 4-hydroxybutyl acrylate and mixtures of these compounds.

Suitable olefinically unsaturated acid-functional monomers IIc) are sulfonic or carboxylic acid-functional monomers, preferably carboxylic acid-functional monomers, such as acrylic acid, methacrylic acid, β-carboxyethyl acrylate, crotonic acid, fumaric acid, maleic anhydride, itaconic acid or monoalkyl esters of dibasic acids or anhydrides, such as e.g. maleic acid monoalkyl esters, and acrylic or methacrylic acid are preferred.

Unsaturated compounds which can undergo free-radical polymerization and have phosphate or phosphonate, or sulfonic acid or sulfonate groups, such as are described e.g., in WO-A 00/39181 (p. 8, l. 13-p. 9, l. 19) are furthermore also suitable as compounds of component IIc).

Suitable initiators for the polymerization reaction are organic peroxides, such as di-tert-butyl peroxide or tert-butyl peroxy-2-ethylhexanoate, and azo compounds, such as azo-diisobutyric acid nitrile (AIBN). The amounts of initiator employed depend on the desired molecular weight. For reasons of process reliability and easier handling, peroxide initiators can also be employed as a solution in suitable organic solvents of the type mentioned below.

The preparation of the copolymer A) is carried out by a copolymerization, initiated by free radicals, of the monomer mixture I) and II) in organic solvent (mixtures). The amount of organic solvents is chosen such that the resulting solutions of the copolymers A) have a solids content of from 95 to 60 wt. %, preferably 92.5 to 80 wt. %.

The procedure for polymerization of the unsaturated monomers is familiar per se to the person skilled in the art. Typically, for this, a suitable solvent is initially introduced into a reaction vessel and the unsaturated monomers are polymerized in the feed process using a free radical initiator.

Possible suitable organic solvents are any desired solvents known in lacquer technology, preferably those which are conventionally employed as co-solvents in aqueous dispersions, such as e.g. alcohols, ethers, alcohols containing ether groups, esters, ketones or non-polar hydrocarbons, e.g. aliphatic or aromatic hydrocarbons or mixtures of these solvents.

The preparation of component A) in embodiment (α) or (β) is carried out by a two-stage addition and polymerization of the monomer mixtures I) and II) in the sequence mentioned. In this context, in a first step (i) a hydroxy-functional hydrophobic polymer I) having an OH number of from 12 to 250 mg of KOH/g of solid, preferably from 50 to 200 mg of KOH/g of solid, is prepared from the monomers Ia) and Ib). In a subsequent step (ii), the hydroxy-functional hydrophilic polymer II) is prepared from the monomers IIa) to IIc) in the solution of the polymer I) obtained from step (i), this hydroxy-functional hydrophilic polymer II) having an OH number of from 20 to 250 mg of KOH/g of solid, preferably from 120 to 220 mg of KOH/g of solid, and an acid number of from 50 to 250 mg of KOH/g of solid, preferably from 110 to 200 mg of KOH/g of solid. Silane-functional monomers IS1) are copolymerized accordingly with monomer mixture Ia) and Ib), or IIS2) with monomer mixture IIa), IIb) and IIc).

The preparation of component A) in embodiment (γ) is carried out by a two-stage addition and polymerization of the monomer mixtures I) and II) in the sequence mentioned. In this context, in a first step (i) a hydroxy-functional hydrophobic polymer I) having an OH number of from 12 to 250 mg of KOH/g of solid, preferably from 50 to 200 mg of KOH/g of solid, is prepared from the monomers Ia) and Ib). In a subsequent step (ii), the hydroxy-functional hydrophilic polymer II) is prepared from the monomers IIa) to IIc) and IIS2) in the solution of the polymer I) obtained from step (i). In this step, according to the free-radical polymerization of components IIa) to IIc), the reaction of the epoxide groups of IIS2) with free carboxylic acid group is carried out simultaneously. This reaction can optionally be catalyzed by suitable esterification catalysts, such as e.g. dibutyltin dilaurate or tin dioctoate. The hydroxy-functional hydrophilic polymer II) has an OH number of from 20 to 250 mg of KOH/g of solid, preferably from 120 to 220 mg of KOH/g of solid and an acid number of from 50 to 250 mg of KOH/g of solid, preferably from 110 to 200 mg of KOH/g of solid.

Organic amines or water-soluble inorganic bases can be employed for neutralization of the carboxyl groups polymerized into the copolymer A). N-Methylmorpholine, triethylamine, dimethylethanolamine, dimethylisopropanolamine, methyldiethanolamine, triethanolamine or ethyl-diisopropylamine are preferred. Diethylethanolamine, butanolamine, morpholine, 2-aminomethyl-2-methyl-propanol or isophoronediamine are likewise suitable.

The neutralizing agent is added in amounts such that the degree of neutralization is 70 to 130%, preferably 90 to 105% of the carboxyl groups, an amount of neutralizing agent such that after conversion of all the carboxyl groups into the salt form free neutralizing agent is still present particularly preferably being added. This corresponds to a degree of neutralization of >100%.

The resulting hydrophilic polymers A) are then dispersed by addition of water or by transfer into water. The pH of the aqueous dispersion is 6.0 to 11.0, preferably 7.5 to 10.0, and the solids content is 35 to 65 wt. %, preferably 40 to 55 wt. %.

Possible particles B) are inorganic oxides, mixed oxides, hydroxides, sulfates, carbonates, carbides, borides and nitrides of elements of main group II to IV and/or elements of subgroup I to VIII of the periodic table, including the lanthanides. Preferred particles B) are silicon oxide, aluminium oxide, cerium oxide, zirconium oxide, niobium oxide and titanium oxide, and silicon oxide nanoparticles are particularly preferred.

The particles employed preferably have average particles sizes, determined as the z-mean by means of dynamic light scattering in dispersion, of from 5 to 100 nm, particularly preferably 5 to 50 nm.

Preferably at least 75%, particularly preferably at least 90%, very particularly preferably at least 95% of all the particles employed have the sizes defined above.

The optionally surface-modified nanoparticles B) are introduced during or after the preparation of the modified copolymer A). This can be carried out by simply stirring in the particles. However, the use of an increased dispersing energy, such as, for example, by ultrasound, jet dispersion or high-speed stirrers according to the rotor-stator principle, is also conceivable. Simple mechanical stirring-in is preferred.

The particles B) can in principle be employed both in powder form and in the form of colloidal suspensions or dispersions in suitable solvents. The inorganic nanoparticles B) are preferably employed in a colloidally disperse form in organic solvents (organosols) or in water.

Suitable solvents for the organosols are methanol, ethanol, i-propanol, acetone, 2-butanone, methyl isobutyl ketone, butyl acetate, ethyl acetate, 1-methoxy-2-propyl acetate, toluene, xylene, 1,4-dioxane, diacetone alcohol, ethylene glycol n-propyl ether or any desired mixtures of such solvents. Suitable organosols have a solids content of from 10 to 60 wt. %, preferably 15 to 50 wt. %. Suitable organosols are, for example, silicon dioxide organosols, such as are obtainable e.g. under the trade names Organosilicasol® and Suncolloid® (Nissan Chem. Am. Corp.) or under the name Highlink® NanO G (Clariant GmbH).

If the nanoparticles are employed in organic solvents (organosols), these are mixed with the copolymers A) before dispersion thereof with water. The resulting mixtures are then dispersed in water by addition of water or by transfer into water. The mixing of the organosols with copolymers A) can be carried out either before or after neutralization of the carboxyl groups polymerized into cooplymer A). If required, the organic solvent of the organosol can be removed by distillation before or after the dispersing with water, preferably after the dispersing with water.

In the context of the present invention, inorganic particles B) are furthermore preferably used in the form of their aqueous formulations. The use of inorganic particles B) in the form of aqueous formulations of surface-modified inorganic nanoparticles is particularly preferred. These can be modified by silanization, for example, before or at the same time as the incorporation into the silane-modified polymeric organic binder or an aqueous dispersion of the silane-modified polymeric organic binder. This method is known in principle from the literature and is described, for example, in DE-A 19846660 or WO 03/44099.

The surface of the inorganic nanoparticles can furthermore be modified adsorptively/associatively by surfactants or block copolymers, as described, for example, in WO 2006/008120 and Foerster, S. & Antonietti, M., Advanced Materials, 10, no. 3, (1998) 195.

Preferred surface modification is the silanization with alkoxysilanes and/or chlorosilanes. Partial modification with γ-glycidoxypropyltrimethoxysilane corresponding to WO 2004/035474 is particularly preferred.

Preferred aqueous commercial nanoparticle dispersions are Levasils® (H.C. Starck GmbH, Goslar, Germany) and Bindzils® (EKA Chemical AB, Bohus, Sweden). Aqueous dispersion of Bindzil® CC 30 and Bindzil® CC 40 from EKA (EKA Chemical AB, Bohus, Sweden) are particularly preferably employed.

If the nanoparticles are employed in aqueous form, these are added to the aqueous dispersions of the copolymers A). In a further embodiment, the aqueous nanoparticle colloids are added to the copolymers A) after neutralization of the carboxyl groups polymerized into copolymer A) and the mixture is optionally then diluted further with water.

The aqueous formulations according to the invention can be processed to aqueous coating compositions. In this context, by combination with crosslinking agents D), depending on the reactivity or, where appropriate, blocking of the crosslinking agents, both one-component lacquers and two-component lacquers can be prepared. One-component lacquers in the context of the present invention are to be understood here as meaning coating compositions in which the binder component and crosslinking component can be stored together without a crosslinking reaction taking place to an extent which is noticeable or harmful for the later application. The crosslinking reaction takes place only on application after activation of the crosslinking agent. This activation can be effected e.g. by increasing the temperature. Two-component lacquers in the context of the present invention are understood as meaning coating compositions in which the binder component and crosslinking component must be stored in separate vessels because of their high reactivity. The two components are mixed only shortly before application and then in general react without additional activation. However, catalysts can also be employed or higher temperatures applied in order to accelerate the crosslinking reaction.

The present invention therefore also provides aqueous coating compositions comprising the aqueous formulations according to the invention and at least one crosslinking agent D).

Suitable crosslinking agents D) are, for example, polyisocyanate crosslinking agents, amide- and amine-formaldehyde resins, phenolic resins and aldehyde and ketone resins, such as e.g. phenol-formaldehyde resins, resols, furan resins, urea resins, carbamic acid ester resins, triazine resins, melamine resins, benzoguanamine resins, cyanamide resins and aniline resins, such as are described in "Lackkunstharze", H. Wagner, H. F. Sarx, Carl Hanser Verlag Munich, 1971.

Preferred crosslinking agents D) are free or blocked polyisocyanates, which can optionally be hydrophilically modified, and/or non-blocked polyisocyanates which are at least partly hydrophilically modified.

The present invention likewise provides aqueous two-component (2C) coating compositions comprising the aqueous formulations according to the invention and a polyisocyanate. Preferably, at least a proportion of the polyisocyanate is hydrophilically modified.

Suitable polyisocyanates are difunctional isocyanates, such as e.g. isophorone-diisocyanate, hexamethylene-diisocyanate, 2,4- or 2,6-diisocyanatotoluene, 4,4'-diphenylmethane-diisocyanate and/or higher molecular weight trimers thereof, biurets, urethanes, iminooxadiazinedione and/or allophanates. The use of low-viscosity, optionally hydrophilized polyisocyanates of the abovementioned type based on aliphatic or cycloaliphatic isocyanates is particularly preferred.

For the blocking, the abovementioned polyisocyanates are reacted with blocking agents, such as e.g. methanol, ethanol, butanol, hexanol, benzyl alcohol, acetoxime, butanone oxime, caprolactam, phenol, diethyl malonate, dimethyl malonate, dimethylpyrazole, triazole, dimethyltriazole, ethyl acetoacetate, diisopropylamine, dibutylamine, tert-butylbenzylamine, cyclopentanone carboxyethyl ester, dicyclohexylamine and/or tert-butylisopropylamine.

The non-blocked and blocked polyisocyanates can also be converted into a water-dispersible form by incorporation of hydrophilic groups, such as e.g. carboxylate, sulfonate and/or polyethylene oxide structures, and employed in this way in combination with the formulations according to the invention. The blocked polyisocyanates mentioned can also be prepared co-using hydroxy- or amino-functional, also higher molecular weight components, such as e.g. diols, triols, amino alcohols, polyesters, polyethers, polycarbonates and mixtures of the raw materials mentioned and/or other raw materials.

The polyisocyanates employed as crosslinking agent D) in general have a viscosity at 23° C. of from 10 to 5,000 mPas and, if desired for adjusting the viscosity, can also be employed as a mixture with small amounts of inert solvents.

The use of mixtures of various crosslinking agents D) is of course also possible in principle.

The conventional auxiliary substances and additives of lacquer technology, such as e.g. defoaming agents, thickening agents, pigments, dispersing auxiliaries, catalysts, skin prevention agents, antisettling agents or emulsifiers, can be added before, during or after the preparation of the aqueous formulations according to the invention.

The aqueous coating compositions comprising the formulations according to the invention are suitable for all fields of use in which aqueous paint and coating systems with high requirements on the resistance of the films are used, e.g. for coating of mineral building material surfaces, lacquering and sealing of wood and wood materials, coating of metallic surfaces (metal coating), coating and lacquering of asphalt- or bitumen-containing coverings, lacquering and sealing of diverse surfaces of plastic (coating of plastics) and as high gloss lacquers.

The aqueous coating compositions comprising the formulations according to the invention are employed for the preparation of primers, fillers, pigmented or transparent top lacquers, clear lacquers and high gloss lacquers as well as one-coat lacquers, which can be used in individual or series application, e.g. in the field of industrial lacquering and automobile first and repair lacquering.

Curing of the aqueous coating compositions comprising the formulations according to the invention is typically carried out in this context at temperatures of from 0 to 60° C., preferably from 18 to 130° C.

These coatings have, together with very good optical properties of the film, a high level of scratch resistance, resistance to solvents and chemicals, good weather resistance, high hardness and rapid drying.

The coatings can be produced by the various spraying processes, such as, for example, pneumatically or by airless or electrostatic spraying processes, using one- or optionally two-component spraying installations. However, the lacquers and coating compositions comprising the aqueous coating compositions according to the invention can also be applied by other methods, for example by brushing, rolling or knife coating.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless noted otherwise, the per cent data are to be understood as percent by weight.

The hydroxyl number (OH number) was determined in accordance with DIN 53240-2.

The viscosity was determined by means of a rotary viscometer "Paar Physica MC R51" in accordance with DIN EN ISO 3219.

The acid number was determined in accordance with DIN EN ISO 2114.

Determination of the Particle Size

The particle sizes were determined by means of dynamic light scattering using an HPPS particle size analyzer (Malvern, Worcestershire, UK). The evaluation was performed via the Dispersion Technology software 4.10. To avoid multiple scattering, a highly dilute dispersion of the nanoparticles was prepared. One drop of a dilute nanoparticle dispersion (approx. 0.1-10%) was introduced into a cell containing approx. 2 ml of the same solvent as the dispersion, the cell was shaken and measurement was carried out in the HPPS analyzer at 20 to 25° C. As is generally known to the person skilled in the art, the relevant parameters of the dispersing medium—temperature, viscosity and refractive index—were entered into the software beforehand. In the case of organic solvents, a glass cell was employed. An intensity- and volume-particle diameter curve and the z-mean for the particle diameter were obtained as the result. It was ensured that the polydispersity index was <0.5.

Bayhydur® XP 2655: hydrophilic aliphatic polyisocyanate based on hexamethylene-diisocyanate, isocyanate content: 21.2±0.5% (Bayer MaterialScience AG/Leverkusen, Germany)

Bindzil® CC40: 40% strength colloidally disperse surface-modified silicon dioxide in water, average particle size 12 nm according to the manufacturer (EKA Chemical AB, Bohus, Sweden); a z-average particle size of approx. 29 nm was obtained by means of dynamic light scattering Byk® 325: flow auxiliary (Byk-Chemie GmbH, Wesel, Germany)

Byk® 345: wetting additive (Byk-Chemie GmbH, Wesel, Germany)

CoatOSil® 1706: vinyl-tris-i-propoxysilane (Momentive/Leverkusen, Germany)

Desmodur® XP 2410: aliphatic polyisocyanates, isocyanate content: 23.5±0.5% (Bayer MaterialScience AG/Leverkusen, Germany)

Dowanol® PnB: solvent (Dow Chem. Corp., Horgen, Switzerland)

Organosilicasol® MEK-ST: 36 wt. % strength colloidally disperse silicon dioxide in 2-butanone, average particle size 10-15 nm according to the manufacturer (Nissan Chem. Am. Corp., Houston/Tex., USA); a z-average particle size of approx. 15-40 nm was obtained by means of dynamic light scattering Rhodiasolv® RPDE: solvent (Rhodia Syntech GmbH, Frankfurt a. M., Germany)

Comparison Example 1

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 100° C. and 31.2 g of N,N-dimethylethanolamine were added. After homogenizing for 30 minutes, dispersing was carried out with 1,595 g of water at 80° C. over a period of 2 hours. A copolymer dispersion having the following data was obtained:

| | |
|---|---|
| OH content (calculated for solids) | 4.5% |
| Acid number (solids) | 15.5 mg of KOH/g |
| Solids content | 40.1% |
| Viscosity | 580 mPas$_{23° C.}$ |
| pH (10% strength in water) | 8.4 |
| Degree of neutralization | 105% |
| Average particle size | 105 nm |
| Cosolvent | 7.8 wt. % |

Comparison Example 2

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 218 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,690 g of water at approx. 60° C. over a period of 2 hours. The methyl ethyl ketone was then distilled off in vacuo. A copolymer dispersion having the following data was obtained:

| | |
|---|---|
| OH content (calculated for solids) | 4.2% |
| Acid number (solids) | 14.5 mg of KOH/g |
| Solids content | 40.7% |
| Viscosity | 430 mPas$_{23° C.}$ |
| pH (10% strength in water) | 8.2 |
| Degree of neutralization | 105% |
| Average particle size | 96 nm |
| Cosolvent | 7.4 wt. % |

Comparison Example 3

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 436 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,790 g of water at approx. 60° C. over a period of 2 hours. The methyl ethyl ketone was then distilled off in vacuo. A copolymer dispersion having the following data was obtained:

| | |
|---|---|
| OH content (calculated for solids) | 4.0% |
| Acid number (solids) | 13.5 mg of KOH/g |
| Solids content | 40.3% |
| Viscosity | 440 mPas$_{23° C.}$ |
| pH (10% strength in water) | 8.4 |
| Degree of neutralization | 105% |
| Average particle size | 135 nm |
| Cosolvent | 7.0 wt. % |

Comparison Example 4

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 139 g of styrene and 90.4 g of 2-ethylhexyl acrylate was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 680 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,595 g of water at approx. 60° C. over a period of 2 hours. The methyl ethyl ketone was then distilled off in vacuo. A copolymer dispersion having the following data was obtained:

| | |
|---|---|
| OH content (calculated for solids) | 3.8% |
| Acid number (solids) | 12.7 mg of KOH/g |
| Solids content | 44.3% |
| Viscosity | 840 mPas$_{23° C.}$ |
| pH (10% strength in water) | 8.6 |
| Degree of neutralization | 105% |
| Average particle size | 153 nm |
| Cosolvent | 7.2 wt. % |

Comparison Example 5

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 126.5 g of styrene, 90.4 g of 2-ethylhexyl acrylate and 12.5 g of CoatOSil® 1706 was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 100° C. and 31.2 g of N,N-dimethylethanolamine were added. After homogenizing for 30 minutes, dispersing was carried out with 1,595 g of water at 80° C. over a period of 2 hours. A copolymer dispersion having the following data was obtained:

| | |
|---|---|
| OH content (calculated for solids) | 4.5% |
| Acid number (solids) | 15.5 mg of KOH/g |
| Solids content | 40.2% |
| Viscosity | 500 mPas$_{23° C.}$ |
| pH (10% strength in water) | 8.4 |
| Degree of neutralization | 105% |
| Average particle size | 100 nm |
| Cosolvent | 7.8 wt. % |

Example 6

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 126.5 g of styrene, 90.4 g of 2-ethylhexyl acrylate and 12.5 g of CoatOSil® 1706 was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 436 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,790 g of water at approx. 60° C. over a period of 2 hours. The methyl ethyl ketone was then distilled off in vacuo. A copolymer dispersion having the following data was obtained:

| | |
|---|---|
| OH content (calculated for solids) | 4.0% |
| Acid number (solids) | 13.5 mg of KOH/g |
| Solids content | 40.3% |
| Viscosity | 370 mPas$_{23° C.}$ |
| pH (10% strength in water) | 8.4 |
| Degree of neutralization | 105% |
| Average particle size | 125 nm |
| Cosolvent | 7.0 wt. % |

Example 7

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 126.5 g of styrene, 90.4 g of 2-ethylhexyl acrylate and 12.5 g of CoatOSil® 1706 was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 680 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,595 g of water at approx. 60° C. over a period of 2 hours. The methyl ethyl ketone was then distilled off in vacuo. A copolymer dispersion having the following data was obtained:

| | |
|---|---|
| OH content (calculated for solids) | 3.7% |
| Acid number (solids) | 12.5 mg of KOH/g |
| Solids content | 44.5% |
| Viscosity | 560 mPas$_{23° C.}$ |
| pH (10% strength in water) | 8.4 |
| Degree of neutralization | 105% |
| Average particle size | 150 nm |
| Cosolvent | 7.2 wt. % |

Example 8

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 126.5 g of styrene, 90.4 g of 2-ethylhexyl acrylate and 12.5 g of CoatOSil® 1706 was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 872 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 1,985 g of water at approx. 60° C. over a period of 2 hours. The methyl ethyl ketone was then distilled off in vacuo. A copolymer dispersion having the following data was obtained:

| | |
|---|---|
| OH content (calculated for solids) | 3.6% |
| Acid number (solids) | 12.5 mg of KOH/g |
| Solids content | 41.5% |
| Viscosity | 560 mPas$_{23° C.}$ |
| pH (10% strength in water) | 8.4 |
| Degree of neutralization | 105% |
| Average particle size | 150 nm |
| Cosolvent | 6.3 wt. % |

Example 9

220 g of Dowanol® PnB were initially introduced into a 5 l reaction vessel with a stirring, cooling and heating device and were heated up to 138° C. A mixture 1) of 4 g of di-tert-butyl peroxide in 4 g of Dowanol® PnB was added dropwise at this temperature in the course of 30 minutes. Immediately thereafter, a mixture 2) of 298.3 g of i-bornyl methacrylate, 292.0 g of hydroxyethyl acrylate, 169.8 g of butyl methacrylate, 76.5 g of styrene, 90.4 g of 2-ethylhexyl acrylate and 62.5 g of CoatOSil® 1706 was metered in during the course of 3.5 hours, and immediately thereafter a mixture 3) of 63.8 g of styrene, 90 g of hydroxyethyl acrylate, 50 g of butyl acrylate and 28.7 g of methacrylic acid was metered in during the course of 1.5 hours. In parallel with mixture 2) and 3), a mixture 4) of 14.5 g of di-tert-butyl peroxide in 14.5 g of Dowanol® PnB was metered in over a period of 5 hours. A mixture 5) of 4 g of di-tert-butyl peroxide in 4 g of Dowanol® PnB was then metered in over a period of 1 hour. The mixture was then cooled to 70° C. 1,308 g of a 36 wt. % strength colloidal dispersion of silicon dioxide in methyl ethyl ketone (Organosilicasol® MEK-ST, Nissan Chem. Am. Corp.) were introduced into this melt. 31.2 g of N,N-dimethylethanolamine were then added, the mixture was homogenized for 30 minutes and dispersing was carried out with 2,180 g of water at approx. 60° C. over a period of 2 hours. The methyl ethyl ketone was then distilled off in vacuo. A copolymer dispersion having the following data was obtained:

| | |
|---|---|
| OH content (calculated for solids) | 3.2% |
| Acid number (solids) | 11.5 mg of KOH/g |
| Solids content | 41.5% |
| Viscosity | 430 mPas$_{23° C.}$ |
| pH (10% strength in water) | 8.4 |
| Degree of neutralization | 105% |
| Average particle size | 155 nm |
| Cosolvent | 5.8 wt. % |

Example 10

15 wt. % of SiO$_2$ Nanoparticles, Aqueous SiO$_2$ Sol 4,000 g of aqueous dispersion according to Comparison Example 5 were mixed with 705 g of Bindzil® CC40 in a 5 l reaction vessel with a stirring, cooling and heating device. A homogeneous aqueous dispersion resulted.

| | |
|---|---|
| OH content (calculated for solids) | 3.6% |
| Acid number (solids) | 12.5 mg of KOH/g |
| Solids content | 40.2% |
| Viscosity | 430 mPas$_{23° C.}$ |
| pH (10% strength in water) | 8.4 |
| Degree of neutralization | 105% |
| Average particle size | 155 nm |
| Cosolvent | 6.3 wt. % |

Example 11

Crosslinking Agent 750 g of Rhodiasolv® RPDE were initially introduced into a 5 l reaction vessel with a stirring, cooling and heating device. 2,975 g of Desmodur® XP 2410 and 1275 g of Bayhydur® XP 2655 were added and the components were mixed homogeneously.

The resulting crosslinking agent had an isocyanate content of 19.3%.

Use Examples 12

The individual components of component A and B were mixed in the stated ratios of amounts.

The mixed 2C water-based clear lacquer was applied by means of a commercially available spray gun to an aluminium sheet which had been precoated with an aqueous filler layer and an aqueous black base lacquer layer conventional for automobile first lacquering.

After the application, the sheets were dried in air for 5 minutes at room temperature and 10 minutes at 80° C., and thereafter dried at 130° C. for 30 minutes. The dry layer thickness of the clear lacquer was approx. 40 μm.

Gloss and Haze

The gloss was measured in accordance with DIN EN ISO 2813. The higher the gloss measurement value, the better the gloss. The haze was measured in accordance with DIN EN ISO 13803. The lower the haze value, the clearer the lacquer.

Scratch Resistance

Testing of the scratch resistance of the clear lacquers prepared was carried out in accordance with DIN 55668.

The relative residual gloss in % reproduces how high the degree of gloss [20°] is after scratching in accordance with DIN 5668 compared with the degree of gloss before scratching. The higher this value, the better the scratch resistance.

As Examples 12 A to K clearly show, formulations 12 F to K according to the invention are distinguished by improved scratch resistance, while retaining the good optical properties, in particular low haze.

The invention claimed is:

1. A method for stabilizing inorganic nanoparticles, wherein the method comprises forming an aqueous formulation comprising A) a silane-modified copolymer comprising groups of general formula (1)

$$-Si(R^1O)_2R^2 \qquad (1)$$

| Example 12 | A pt. by wt. | B pt. by wt. | C pt. by wt. | D pt. by wt. | E pt. by wt. | F pt. by wt. | G pt. by wt. | H pt. by wt. | I pt. by wt. | K pt. by wt. |
|---|---|---|---|---|---|---|---|---|---|---|
| Component A | | | | | | | | | | |
| Example 1 | 500 | | | | | | | | | |
| Example 2 | | 500 | | | | | | | | |
| Example 3 | | | 500 | | | | | | | |
| Example 4 | | | | 500 | | | | | | |
| Example 5 | | | | | 500 | | | | | |
| Example 6 | | | | | | 500 | | | | |
| Example 7 | | | | | | | 500 | | | |
| Example 8 | | | | | | | | 500 | | |
| Example 9 | | | | | | | | | 500 | |
| Example 10 | | | | | | | | | | 500 |
| Byk ® 345 | 4 | 4 | 4 | 4 | 4 | 4 | 4 | 4 | 4 | 4 |
| Byk ® 325 | 1.25 | 1.25 | 1.25 | 1.25 | 1.25 | 1.25 | 1.25 | 1.25 | 1.25 | 1.25 |
| Water | 74.5 | 61.8 | 50.5 | 89.2 | 75.1 | 50.9 | 89.7 | 34.1 | 21.7 | 27.2 |
| Component B | | | | | | | | | | |
| Example 11 | 149.1 | 132.7 | 118.8 | 115.4 | 149.1 | 118.7 | 115.3 | 96.9 | 80.7 | 98.9 |
| Results | | | | | | | | | | |
| Content of nano-SiO₂ based on solids (wt. %) | 0.0 | 3.6 | 6.9 | 10.5 | 0.0 | 6.9 | 10.5 | 13.6 | 19.7 | 10.0 |
| Gloss/haze | 90/10 | 90/15 | 88/35 | 83/113 | 91/9 | 90/11 | 91/10 | 90/15 | 90/18 | 90/17 |
| Visual evaluation of haze | clear | slight haze | significant haze | severe haze | clear | clear | clear | clear | clear | slight haze |
| Dry scratch resistance, 10 double strokes Residual gloss (rel. %) | 18 | 19 | 21 | 20 | 19 | 30 | 43 | 59 | 55 | 91 | wherein
R¹ is a $C_2$- to $C_8$-alkyl radical; and
R² is ($R^1O$) or a $C_1$- to $C_5$-alkyl radical,
built up from
I) a hydroxy-functional hydrophobic polymer containing as builder monomers
  Ia) (meth)acrylic acid esters having $C_1$- to $C_{18}$-hydrocarbon radicals in the alcohol part and/or vinylaromatics and/or vinyl esters;
  Ib) hydroxy-functional monomers; and
  IS1) silane-functional monomers capable of polymerization;
and
II) a hydroxy-functional hydrophilic polymer containing as builder components
  IIa) (meth)acrylic acid esters having $C_1$- to $C_{18}$-hydrocarbon radicals in the alcohol part and/or vinylaromatics and/or vinyl esters;
  IIb) hydroxy-functional monomers; and
  IIc) acid-functional monomers;
B) inorganic particles which are optionally surface-modified, and having an average particle size (z-mean), as determined by means of dynamic light scattering in dispersion, of less than 200 nm, wherein said inorganic particles B) are inorganic nanoparticles in a colloidally disperse form in organic solvents or in water; and
C) water;
wherein the inorganic particles are introduced by mechanical stirring.

2. The method of claim 1, wherein said silane-functional monomer IS1), which is capable of polymerization, is a compound of the general formula (2)

$$(R^1O)_2R^2Si-(CH=CH_2) \qquad (2)$$

wherein
R¹ is a $C_2$- to $C_8$-alkyl radical; and
R² is ($R^1O$) or a $C_1$- to $C_5$-alkyl radical;
and/or a compound of the general formula (3)

$$(R^1O)_2R^2Si(CH_2)_m-O(CO)-(CR^3=CH_2) \qquad (3)$$

wherein
R¹ is a $C_2$- to $C_8$-alkyl radical;
R² is ($R^1O$) or a $C_1$- to $C_5$-alkyl radical;
R³ is H or $CH_3$; and
m is 1 to 4.

3. The method of claim 1, wherein said silane-functional monomer IS1), which are capable of polymerization, is selected from the group consisting of vinyltriethoxysilane, vinyltrisisopropoxysilane, vinyl-tris-(2-methoxyethoxy)silane, vinylmethyldiethoxysilane, vinylmethyldiisopropoxysilane, vinylethyldiethoxysilane, 3-(triethoxysilyl)-propyl methacrylate or 3-(tris-isopropoxysilyl)-propyl methacrylate, vinylphenyldiethoxysilane, vinylphenylmethylethoxysilane, and vinyltri-t-butoxysilane.

4. The method of claim 1, wherein said inorganic particles B) are selected from the group consisting of inorganic oxides, mixed oxides, carbides, borides, and nitrides of elements of main group II to IV and/or elements of subgroup I to VIII of the periodic table, including the lanthanides.

5. The method of claim 1, wherein said inorganic particles B) are surface-modified inorganic nanoparticles.

* * * * *